United States Patent [19]

Lefebvre

[11] Patent Number: 5,307,688
[45] Date of Patent: May 3, 1994

[54] METHOD AND FLOWMETER FOR UNSTEADY FLUID FLOW STUDY

[75] Inventor: Paul J. Lefebvre, Tiverton, R.I.

[73] Assignee: The United States of America as represented by the Secretary of the Navy, Washington, D.C.

[21] Appl. No.: 632,872

[22] Filed: Dec. 24, 1990

[51] Int. Cl.⁵ .................................. G01F 1/60
[52] U.S. Cl. ..................... 73/861.16; 73/861.12
[58] Field of Search ............... 73/861.12, 861.16, 3; 364/510

[56] References Cited

U.S. PATENT DOCUMENTS

| | | | |
|---|---|---|---|
| 3,380,301 | 4/1968 | Mannherz et al. | 73/861.16 |
| 4,169,375 | 10/1979 | Suzuki | 73/861.16 |
| 4,193,298 | 3/1980 | Kayama et al. | 73/861.16 |
| 4,300,401 | 11/1981 | Pedersen | 73/861.31 |
| 4,417,479 | 11/1983 | Schmoock et al. | 73/861.16 |
| 4,459,857 | 7/1984 | Murray et al. | 73/861.12 |

FOREIGN PATENT DOCUMENTS 0416866 3/1991 European Pat. Off. ......... 73/861.12

OTHER PUBLICATIONS

Durgin, William & Paul Lefebvre, A Transient Electromagnetic Flowmeter & Calibration Facility; *Journal of Fluids Engineering* vol. 112, pp. 12–15, Mar. 1990.

Primary Examiner—Richard E. Chilcot, Jr.
Assistant Examiner—Elizabeth L. Dougherty
Attorney, Agent, or Firm—Michael J. McGowan; Prithvi C. Lall; Michael F. Oglo

[57] ABSTRACT

An electromagnetic flowmeter and a method for measurement of the rate of flow of a fluid under unsteady conditions are described. It uses fluid steady-state flowmeter technology and a new algorithm to measure transient rate of flow of a fluid such as water. The algorithm teaches (a) measuring the e.m.f. generated due to the rate of flow of the fluid under test moving through a tube placed in an area with uniform magnetic flux, and (b) comparing it to a simultaneously generated reference signal which is measure of the magnetic flux density generated when an electromagnetic flowmeter is energized due to the fluid flow rate at the instant of taking the flow rate data of the fluid.

6 Claims, 2 Drawing Sheets

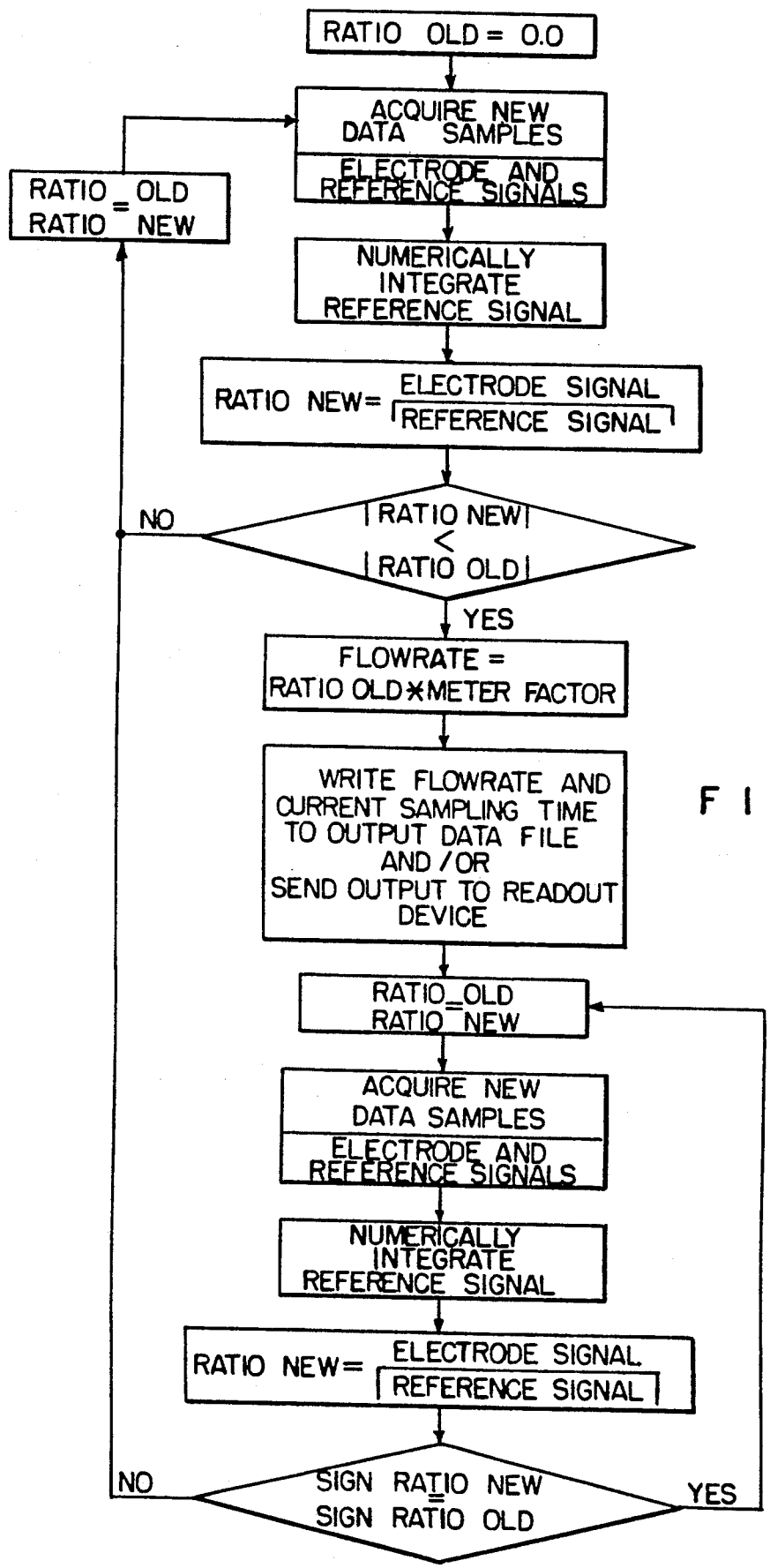

METHOD AND FLOWMETER FOR UNSTEADY FLUID FLOW STUDY

STATEMENT OF GOVERNMENT INTEREST

The invention described herein may be manufactured and used by or for the Government of the United States of America for governmental purposes without the payment of any royalties thereon or therefor.

Subject patent application is related to my other three co-pending patent applications Ser. Nos. 07/632,708, 07/632,709, and 07/632,707, filed 24 Dec. 1990 and which are also directed to various aspects of measurements of flow of fluids such as water.

BACKGROUND OF THE INVENTION

1. Field of the Invention

This invention generally relates to fluid flow measurements and more specifically to an electromagnetic flowmeter and a method for measuring unsteady fluid flow.

2. Statement of Prior Art

Flowmeters of different types have been used for measurements of flow of fluids under steady state conditions. However, they are inherently not applicable to transient flow measurements. As an example, turbine flowmeters are momentum devices. Even though they have a fast signal response time and consequently provide output at an apparently high data rate, the meter calibration is inherently a function of not only velocity profile but also of change of flow rate. Besides, steady-state flowmeters of head type such as orifice plates, are dependent on the response of the pressure transducers used in the differential pressure measurement and the flow field in the vicinity of the orifice can change considerably under high flow transients leading to changes in the orifice's calibration and inaccurate measurements.

Another type of fluid flowmeter commonly used for steady-state flow rate is an electromagnetic flowmeter. In a typical electromagnetic fluid flowmeter, a magnetic field is introduced into the fluid flow. As an electrically conducting fluid flows through the magnetic field, an electromotive force (e.m.f) is generated according to Faraday's Law of Electromagnetism. The e.m.f. generated is proportional to the fluid velocity and is perpendicular to both the electric current vector or the velocity vector of the fluid and the magnetic flux density vector. A measure of the e.m.f. and any variations thereof are proportional to the corresponding variations in the velocity of the fluid provided the magnetic field in the region of interest is kept constant.

Several transient flowmeters have been developed for specific applications based upon commercially available electromagnetic flowmeters for steady-state fluid flow rate conditions. A few special-purpose meters have been developed over the past 25 years that have had some transient flow measurement capabilities. In 1950, Arnold described an electromagnetic flowmeter for small flow rates that responded to very short transients of 0.001 second in duration. Since a circular cross section proved unsatisfactory for the design, a small rectangular cross section of 0.48×1.58 cm was chosen.

In 1960, Iwanicki and Fontaine described an electromagnetic flowmeter, which was also designed to respond to very short transients of low flow rates. The meter, with a 1.2-cm diameter, could not be operated for more than a few seconds due to polarization of the flowing liquid at the signal electrodes. In each case, it was shown that the meters responded to large flow transients. Unfortunately, the facilities used to validate meter performance could not provide information on the accuracy of the flowmeter output. As described partially in my article with W. Durgin: A Transient Electromagnetic Flowmeter and Calibration Facility, Journal of Fluids Engineering, March 1990, p. 12-15, which is incorporated herein in its entirety When steady-state electromagnetic fluid flowmeters are adapted to operate as transient flowmeters, the process, it involves re-design of the electronic required to analyze the transient signal from the transient fluid flowmeter. Many attempts have been made with some success. However, there is still a need for an accurate and a simple method which can be used to measure the transient rate of flow of a fluid.

SUMMARY OF THE INVENTION

The objects and advantages of the present invention are accomplished by using an electromagnetic flowmeter which is an adaptation of a commercially available unit as described in our article in March 1990 issue of Fluids Engineering. An algorithm is also provided according to the teachings of subject invention which makes simple and accurate measurement of transient rate of flow of a fluid. The algorithm teaches measuring the e.m.f. produced which is a measure of the flow rate of the fluid at a rapid rate and comparing it to a simultaneously generated reference signal which is a measure of the magnetic flux density generated by energizing an electromagnet at the instant of taking the flow rate data.

An object of subject invention is to measure accurately transient rate of flow of a fluid.

Another object of subject invention is to measure accurately transient rate of flow of a fluid by using a new algorithm in conjunction with transient electromagnetic flowmeter.

Still another object of subject invention is to compare the e.m.f. generated with the magnetic flux density generated in the region of the flowmeter to correct for any changes in the magnetic flux density due to variations in the power supplied to the electromagnet.

Other objects, advantages and novel features of the invention will become apparent from the following detailed description thereof when considered in conjunction with the accompanying drawings wherein:

BRIEF DESCRIPTION OF THE DRAWINGS

FIG. 4 is a flow chart of the algorithm used to obtain accurate values of the transient rate of a flow of the conducting fluid.

DESCRIPTION OF THE PREFERRED EMBODIMENT

Figure 1:
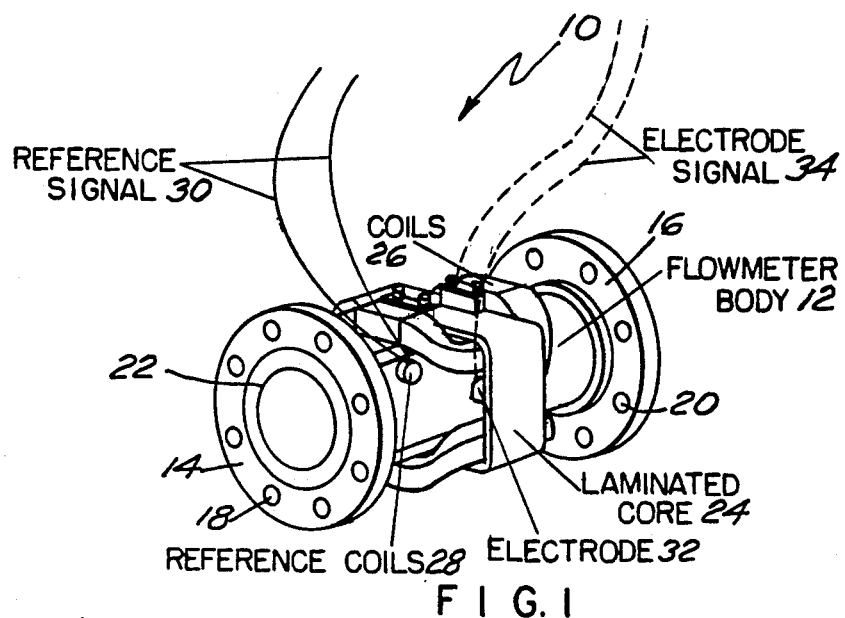
FIG. 1 is a perspective view of transient electromagnetic fluid flowmeter used in conjunction with an algorithm according to the teachings of subject invention.
Figure 2:
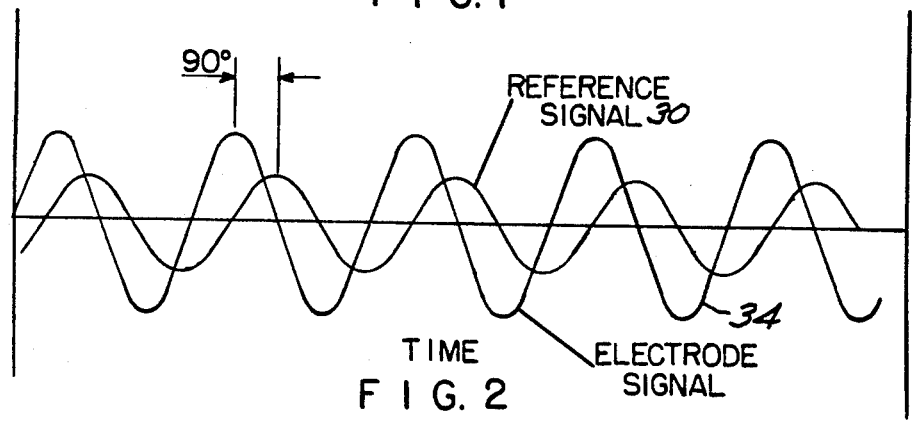
FIG. 2 is a graphical comparison between a reference signal which is a measure of magnetic flux generated and a corresponding electrode signal which is a measure of rate of flow of the conducting fluid.

Referring now to FIG. 1 there is shown an electromagnetic flowmeter to which is the modified version of a conventional electromagnetic flowmeter as partially described in the March 1990 issue of Fluids Engineering in the article authored by P. Lefeb and W. Durgin and incorporated by reference in subject patent application. The flowmeter 10 includes a cylindrical tube 12 which forms the flowmeter body having flanges 14 and 16 at its two ends as shown in FIG. 1. Flanges 14 and 16 are provided with threaded holes such as 18 and 20 and fluid tight seals such as 22 to connect with a pipe through which a conducting fluid under test is flowing. It should be remembered that the conducting fluid is preferably sea water if the test is related to an equipment in the ocean. Any salt in the sea water will make it a conducting fluid which behaves like a conductor carrying an electric current. Tube 12 is surrounded by laminated core 24, and coil 26 as shown in FIG. 1 and they produce magnetic flux in the region of tube 12 when AC power is passed through coil 26. The design of elements 24 and 26 is such as to produce a uniform magnetic flux density for each AC power level applied to coil 26. Reference coils 28 are mounted outside tube 12 which develop a voltage signal due to magnetic induction by the magnetic flux generated by the power through coil 26. Reference coils 28 thus act as a magnetic flux meter and gives an electrical signal which is a measure of the magnetic flux density for a certain voltage and frequency of the AC power applied to coil 20. It should be noted any other magnetic flux meter can be used for this purpose. Coil 26 is connected to the AC power source preferably 110 volts at 60 hertz (Hz), which produces a uniform magnetic flux density in the region which varies sinusoidally and appears as reference signal 30 due to coil 28 which acts like a magnetic flux meter. Any variations AC power and in the frequency of the AC power affects the magnetic flux density in the region. As the conducting fluid passes through tube 12, an electromotive force (e.m.f.) is generated at the two electrodes such as electrode 32 inside the tube 12 of FIG. 1. The e.m.f. generated is proportional to the fluid velocity. The magnitude and frequency of the electromotive force generated due to flow of the conducting fluid, acting as an electrical conductor carrying electric current, in uniform magnetic flux density represented by reference signal 30, is governed by Faraday's law of electromagnetism and is perpendicular to both the fluid velocity vector. The e.m.f. generated is directly proportional both to the magnitudes of the fluid velocity and the magnetic flux density and any change in either or both will change the magnitude of the e.m.f. which is represented by the electrode signal 34. Reference signal 30 and electrode signal 34 are graphically represented FIG. 2. Both 30 and 34 are sinusoidal with the same frequency, but reference signal leading electrode signal by 90 degrees is to be noted that if the magnetic flux density vector changes due to variation of voltage and/or frequency of the power line in addition to the change in the fluid velocity vector occur simultaneously, it will affect the electrode signal, a measure of e.m.f.

Figure 3:
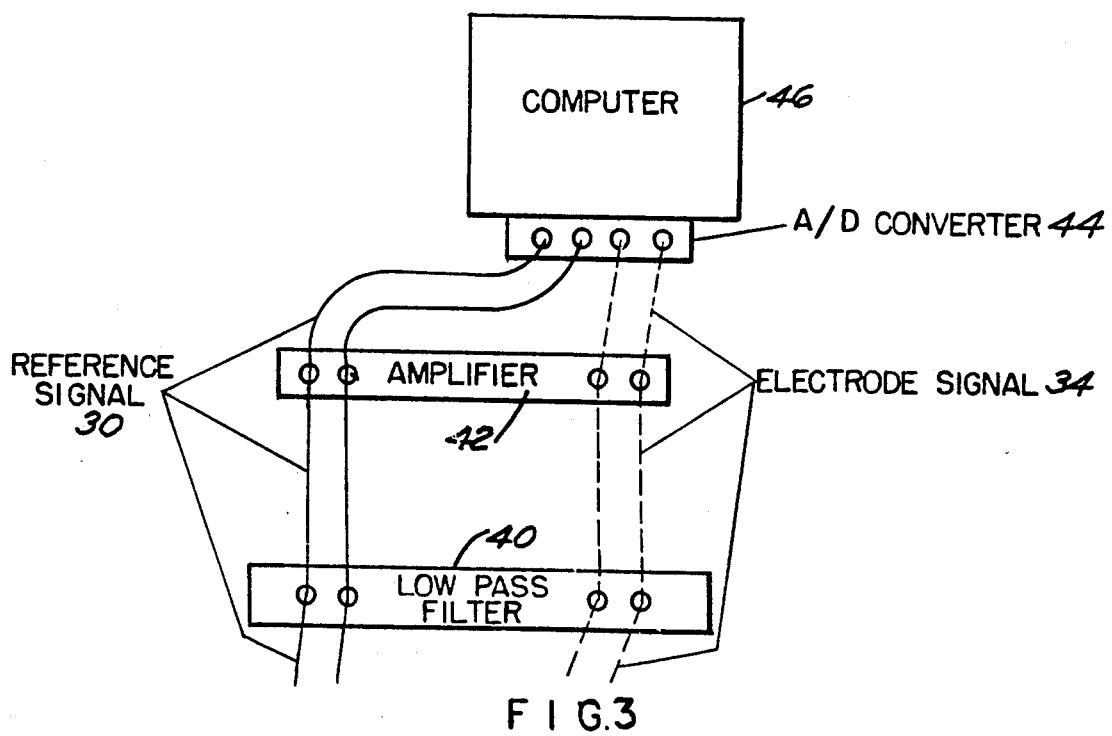
FIG. 3 is a diagrammatic view of the hardware used in conjunction with the algorithm used according to the teachings of subject invention.

In order to find the change in the electrode signal only due to transient rate of flow of the fluid, an instantaneous value of the magnetic flux density will have to be ascertained. This can also be accomplished other means than shown here such as the use of an accurate magnetic flux meter. However, it is done in this preferred embodiment of subject invention by using the electromagnetic flowmeter 10 of FIG. 1 together with the hardware shown in a block diagram in FIG. 3 in conjunction with the algorithm of subject invention shown in a flow chart of FIG. 4.

As stated above, the amplitude of the electrode signal is proportional to the flow velocity. However, to account for changes in the input voltage which subsequently affect the strength of the magnetic field which in turn leads to errors in the proportionality with flow velocity, the following is included: the reference signal is integrated (in a mathematical sense) to shift the signal by 90 degrees. It is to be noted that integrating effectively shifts a sine wave by 90 degrees. This results in both the reference signal and the electrode signal being in phase. The electrode signal is then divided by the reference signal and the resulting ratio hereinafter called ratioed signal, is then used as a more accurate indication of flow velocity, being unaffected by changes in input voltage amplitude and frequency. The next step pertains to how the ratioed signal is easily and economically achieved. The details are as follows:

Reference and electrode analog signals 30 and 34 respectively are passed through analog low pass filter 40 to reduce all frequencies above the signal frequency (60Hz). The output of circuit 40 for each of the analog reference and electrode signals is then amplified by a conventional amplifier 40 and digitized in analog-to-digital converter 44 (A/D converter) at a rate about 6,000 Hz which is 100 times the electrode signal frequency (60Hz). The digital output of A/D converter 44 is then processed in a general purposes computer 46 using the algorithm shown in a flow chart form of FIG. 4.

A computer program or algorithm is used to process the data in real time. The block diagram of FIG. 4 shows the flow diagram of the algorithm used in the process. As each data point is sampled, the computer algorithm numerically integrates the reference signal and then divides the electrode signal by the absolute value of this integrated reference signal, thus providing the required ratio of electrode signal to reference signal. The absolute value of the reference signal is used so that the zero crossing in the electrode signal can be identified later.

As data points are acquired and the ratio is continuously calculated, the algorithm monitors the resulting ratioed sinusoidal signal in order to detect the peak amplitude at each half cycle. Once the peak is obtained, the ratioed signals absolute value starts to decrease. Once the peak value is detected, it is saved as the scaled instantaneous flow rate for that half cycle. This scaled value of amplitude is then multiplied by the meter factor which is a proportionality constant to obtain actual flow rate. The meter calibration factor, or the scaling value relating flow rate to output amplitude, is obtained by calibrating the meter at various steady-state flow rates as is conventionally performed for steady-state meters. Then at each flow rate the signal amplitude is monitored and recorded. The ratio of flow rate to signal amplitude is essentially constant for all flow rates, the average value for all calibration flow rates being the value assigned to the particular meter being tested. Since flow rate information is available at each half cycle the data rate is two times the signal rate, 120 Hz for a 60 Hz data acquisition rate.

Once the amplitude is multiplied by the scale value or meter factor the new amplitude is in units of flow rate and can be either read by some readout device or stored in a data file as a junction of time. The above procedure is accomplished in real time.

To save computing time, once the flow rate is obtained and saved the algorithm checks for a zero crossing (sign change) in the electrode signal to identify the last quarter of the next half cycle. This assures that the new ratio of the signals will be increasing until the next peak is reached. This algorithm thus gives an updated value of the rate of flow of the liquid for measurements of transient rates of flow of fluids in a simple and accurate manner.

Briefly stated, transient rate of fluid flow measurements 17 are obtained by using a modified electromagnetic flow meter in conjunction with an algorithm for a general purpose computer. This is accomplish by updating the data for the magnetic flux density created by an electromagnet in a region of the flow tube in which a conducting fluid is flowing and the e.m.f. induced due to the motion of the conducting fluid in the area of a uniform magnetic field density.

From the foregoing description, one skilled in the art can easily ascertain the essential characteristics of this invention and without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. In the transient measurements of rate of flow of a fluid using an electromagnetic flowmeter including a flow tube with a pair of flanges along longitudinal ends thereof for insertion in a fluid flow pipe, a magnetic core and coil coupled together to form an electromagnet to generate a uniform magnetic flux density in a region around said flow tube and a magnetic flux meter to measure magnetic flux density at any point in time obtained as a reference signal, means for measuring e.m.f. given as an electrode signal resulting from an interaction between said electrically conducting fluid flowing in the fluid flow pipe and the magnetic flux density in said region, an improved method which includes;
    measuring said reference signal as a measure of magnetic flux density;
    measuring said electrode signal which is a measure of interaction between the magnetic flux density vector and the fluid flow velocity vector;
    integrating said reference signal so as to synchronize said reference signal and said electrode signal;
    taking a ratio of the absolute values of said reference and said electrode signals;
    determining a peak value of the ratio of the absolute values of said reference and said electrode signals;
    multiplying said peak value by a meter factor, a proportionality constant to obtain transient fluid flow velocity; and storing said transient fluid flow velocity value.

2. The method of claim 1 which includes the steps of:
    sampling a plurality of data points each data point thereof used to find amplitudes of said reference and electrode signals;
    taking the ratio of said electrode signal and corresponding reference signal to form ratioed electrode signal;
    monitoring said ratioed electrode signal for detecting peak amplitude at each half cycle of a plurality of data cycles;
    determining flow rate for said conducting fluid flow through said flow pipe; and
    storing said flow rate data in a designated data file.

3. The method of claim 2 which further includes the steps of reading said flow rate data in a reading device.

4. The method of claim 1 wherein the step of integrating said reference signal is done electronically by using an integrator.

5. The method of claim 4 wherein said step of determining a peak value of the ratio of said reference and said electrode signals is done every half cycle of input power.

6. The method of claim 5 wherein said meter factor is obtained by calibrating said flow meter under steady state fluid flow rates.

* * * * *